No. 889,625. PATENTED JUNE 2, 1908.
A. KÖNIG & E. DÖNITZ.
TELEMETER.
APPLICATION FILED JUNE 23, 1906.

UNITED STATES PATENT OFFICE.

ALBERT KÖNIG AND EMIL DÖNITZ, OF JENA, GERMANY, ASSIGNORS TO THE FIRM OF CARL ZEISS, OF JENA, GERMANY.

TELEMETER.

No. 889,625.  Specification of Letters Patent.  Patented June 2, 1908.

Application filed June 23, 1906. Serial No. 323,164.

*To all whom it may concern:*

Be it known that we, ALBERT KÖNIG, doctor of philosophy, and EMIL DÖNITZ, engineer, citizens of the German Empire, and residing at Carl Zeiss strasse, Jena, in the Grand Duchy of Saxe-Weimar, Germany, have invented a new and useful Telemeter, of which the following is a specification.

The invention consists in a variation of the well known coincidence telemeter, by which this instrument is rendered available to an improved method of measurement, which affords with objects of very irregular outline greater precision, with objects of any other kind whatever a no less exact result than the coincidence process. Coincidence telemeters consist, as is already known, essentially of two telescopes—with a common ocular—whose image fields are contiguous along a straight boundary line, which is approximately parallel to that of the base line, and also of a device for producing a translation of one of the images in the direction of the base line.

The present invention depends upon two innovations in the arrangement of the coincidence telemeter. Firstly, the straight boundary line between the image fields is arranged perpendicular to the base line. Secondly, the one image, preferably the translatable one, is reversed with respect to the boundary line. With the instrument thus transformed, the distance of an object is measured in the following manner. By directing the instrument in the sighting plane the non-translatable image of the object is brought in proximity to the boundary line, and then the other image is translated so far until it is likewise brought in proximity to the boundary line with just the same lateral distance from it, that is, until both images lie symmetrical to the boundary line. Because of the certain comparability of the short distances of corresponding points of these images from the boundary line and because of the multiplicity of pairs of points whose two distances can be compared, an especially satisfactory exactness of measurement is attained by the symmetry process described.

Figure 1:
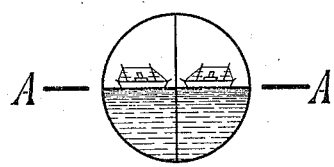
Figure 2:
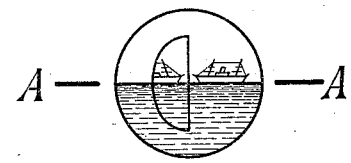
Figure 3:
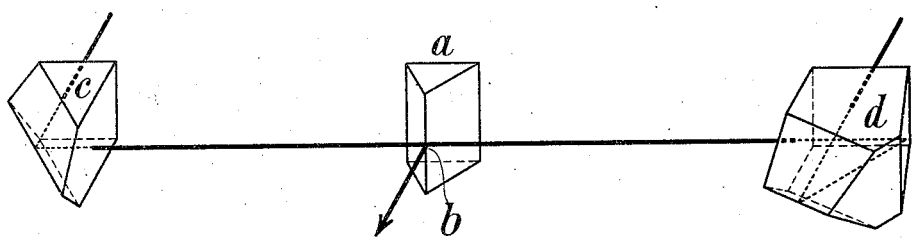
Figure 4:
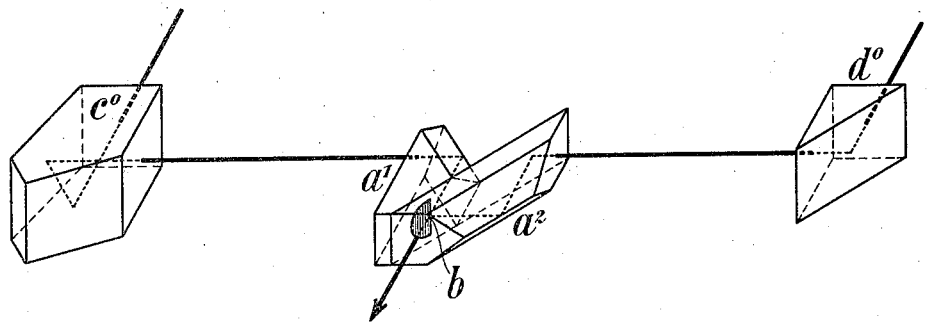
Figure 5:
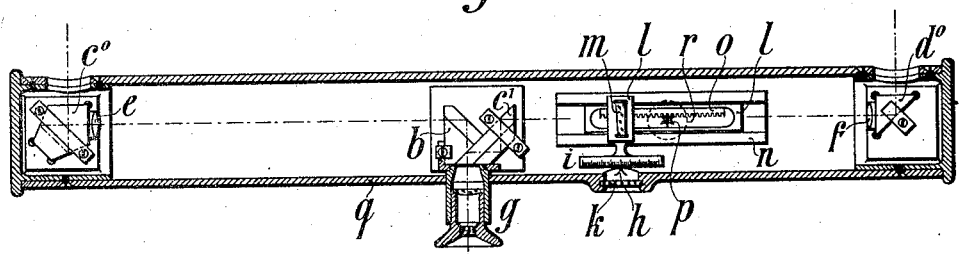

In the annexed drawings: Figure 1 is a diagram of the combined image field of a telemeter. Fig. 2 is a diagram of the combined image field of another telemeter. Fig. 3 is a perspective view of the total prism system of a telemeter. Fig. 4 is a perspective view of the total prism system of another telemeter. Fig. 5 is a sectional plan view of a telemeter.

The lines AA in Figs. 1 and 2 indicate the direction of the base line, which consequently is assumed horizontal. The two images of a vessel at sea shown in each of Figs. 1 and 2 are congruent to one another and symmetrical about the straight boundary line of the image fields. One is the completely reërected image, the other that which is only erect in the direction perpendicular to the base line.

The prism combination shown in Fig. 3 is suitable for producing the configuration of the two image fields according to Fig. 1, the combination shown in Fig. 4 for the configuration according to Fig. 2, both under supposition of a horizontal base line. In Fig. 3 the right angled prism $a$, having reflecting perpendicular surfaces, serves as the separating prism, in whose edge, formed by the perpendicular surfaces, the common focal point $b$ of the objectives is made to lie. Of the two objective prisms, the left one $c$ produces, by means of the two reflections at its ridge surface, but which appear reduced to one in the case of the axial ray impinging on the ridge line as shown a complete reërection of the image inverted by the objective; the reflection occurring once again at the separating prism $a$, however, produces lateral inversion. The image of the left telescope, thus inverted in the horizontal direction, occupies the left image field in Fig. 1. This image is the one best chosen for translation, so that the translation (and measurement) device should be arranged on the left side. The right objective prism $d$ affords, besides the reërecting reflections at the ridge, yet a third, whose effect, however, from the fourth reflection taking place at the separating prism $a$ is neutralized, so that the right image field in Fig. 1 is occupied by the completely erected image of the right telescope.

In the prism system according to Fig. 4, which produces a configuration of the image fields as in Fig. 2, the separating prism comprises the two parts $a^1$ and $a^2$. Surrounded by the cement layer joining the two parts lies a silver film (indicated by cross-hatching) which forms a standing semicircle and receives in the middle of the upright diameter the common focal point $b$ of the objectives. The silver film appears as a half ellipse in the combined image field, as represented in Fig. 2. This half ellipse is occupied by the image produced by the rays of the right telescope, which are reflected from the silver film into the ocular lying in the direction suggested by the arrow, and it is surrounded by the image resulting from those rays of the left telescope not reflected by the silver film. Each part of the separating prism is provided with an image-erecting ridge. The prism $a^2$ produces indeed yet two other reflections, one of which is at the silver semicircle, which, however, neutralize each other in their effect upon the position of the image. On the other hand the only reflecting surface of the right objective prism $d^1$ effects lateral inversion, so that in the half elliptical image field the right telescope image yet appears not completely reërected, but laterally inverted. The left telescope image, however, located in the greater image field which surrounds the half ellipse, is only influenced by the ridge prism $a^1$ and is in consequence completely erected, because the left objective prism $c^0$ presents two reflecting surfaces which together have no effest on the position of the image.

In the symmetry telemeter shown in Fig. 5 the prism system according to Fig. 4 is employed. The complementary lens system consists of the two objectives $e$ and $f$, cemented to the objective prisms $c^0$ and $d^0$, and of the astronomical ocular $g$. By deviation of the right system of pencils, the measuring device produces the translation of the right (laterally inverted) telescope image relatively to its half elliptical frame. The index $h$ and the half erect scale $i$ are visible through the window $k$. The scale is rigidly connected with the carrier $l$ of the deviating prism $m$. To the carrier $l$, which stands with its foot in the slide-rest $n$, the rack $o$ is connected, which, together with the pinion $p$ and—outside the casing $q$—the milled head $r$, serves the purpose of moving the carrier $l$ in its slide-rest $n$.

What we claim as our invention, and desire to secure by Letters Patent, is—.

A telemeter consisting of two telescopes and a device for translating one of the telescope images in the direction of the base line, a single ocular being provided for both telescopes, a separating prism system separating the two image fields with a straight boundary line perpendicular to the base line and the total prism combination of the instrument reërecting one telescope image completely and the other only with respect to the base line.

In testimony whereof we have signed our names to this specification in the presence of two subscribing witnesses.

ALBERT KÖNIG.
EMIL DÖNITZ.

Witnesses:
  PAUL KRÜGER,
  FRITZ SANDER.